W. THOMSON.
Forge Bellows.
No. 27,936.
Patented April 17, 1860.
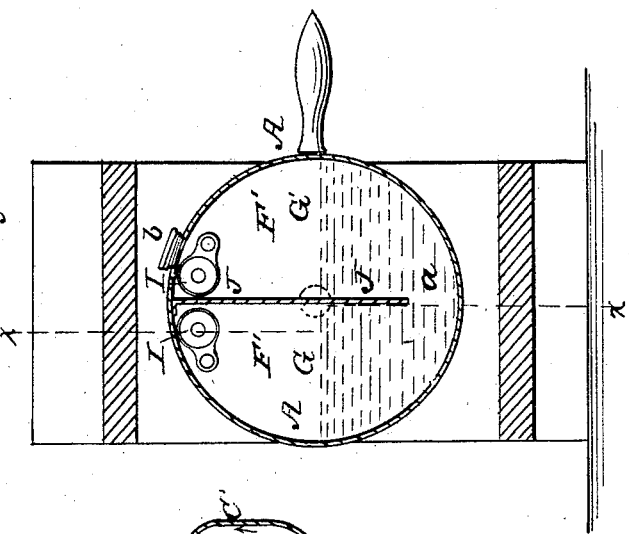
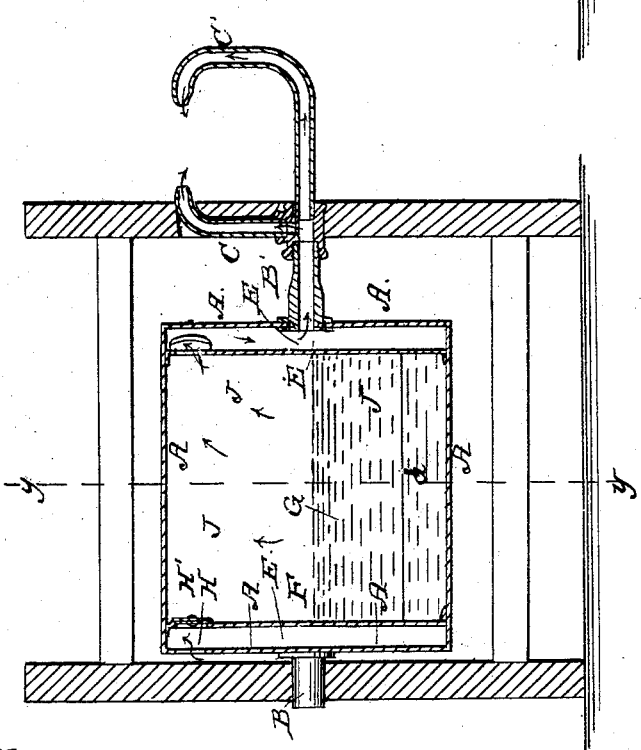

UNITED STATES PATENT OFFICE.

WM. THOMSON, OF DETROIT, MICHIGAN.

FORGE-BELLOWS.

Specification of Letters Patent No. 27,936, dated April 17, 1860.

*To all whom it may concern:*

Be it known that I, WILLIAM THOMSON, of Detroit, in the county of Wayne and State of Michigan, have invented a new and useful Improvement in Forge-Bellows; and I do hereby declare that the following is a full, clear, and exact description thereof, reference being had to the accompanying drawing, forming a part of this specification, in which—

Figure 1 represents a longitudinal vertical section of the apparatus at rest, taken through the red lines $x$, $x$, of Fig. 2, showing by the arrows the direction the currents of air take, in entering and in escaping from the cylinder when the same is put in motion. Fig. 2, is a transverse vertical section taken through the cylinder, as indicated by the red line $y$, $y$, in Fig. 1, showing clearly the internal arrangement of the partition, and valves for the admission of air on each side of the partition when the apparatus is put in motion.

Similar letters of reference indicate corresponding parts in both figures.

The object of this invention, and improvement in forge blowers, is to combine simplicity, cheapness, and efficiency of operation; and to obtain the benefit of a blast or blasts of air which have passed over water, which is found to be better suited to the requirements of the smith, than the ordinary dry air blast. For this purpose my invention consists in the employment of a cylinder of metal or other suitable material of a suitable size, having two compartments in each end connecting with the interior of the cylinder by valvular openings, and with the outer air at one end, and with the forge at the other end, said cylinder to be partially divided longitudinally by an air-tight diaphragm or partition, and to be partly filled with water or other liquid so that by giving to the cylinder a vibrating or rocking motion, air will alternately be drawn into the cylinder on each side of the diaphragm from one end, and forced out the other end by virtue of the contained fluid always keeping its equilibrium on each side of the diaphragm as will be hereinafter explained.

To enable those skilled in the art to fully understand my invention I will proceed to describe its construction and operation.

This apparatus might be called a hydrostatic bellows, as the blast of air is continually and uniformly kept up on account of the gravity of water acting on the air so as to create a vacuum and a pressure alternately, and thus draw air into and force it out of a cylinder as long as the cylinder is kept in motion.

The apparatus consists of a cylinder A, of any suitable capacity, closely headed up so as to be perfectly air tight at the joints which are supported in a horizontal position by hollow trunnions B, B', resting in any suitable bearings, and supported in such a manner that this cylinder may easily be rocked back and forth by hand or by any convenient power. One of the trunnions B, leads directly into the open air, while the other B', is connected to the fixed blast tubes C, C', or to a twyer of any description arranged on the bed of the forge. The tubes or nozzles shown in Fig. 1, of the drawings are arranged so that two blasts will be obtained in the forge, one directly opposite the other, so that the currents would each infringe upon the other, were there no coals in the forge. The place or places of exit for the air can be arranged in any convenient or desirable maner.

The cylinder is divided into four compartments, the two E, E', are formed by second, or partition, heads F, F', and the two G, G', are formed by a central diaphragm or partial partition J, which is secured air tight to the inner partitions F, F', and projects down nearly to the opposite side of the cylinder, leaving a space $a$, between the lower edge of the partition and the cylinder. The interior partitions F, F', have movable openings in them, situated at or near the top of the central diaphragm; the two H, H', open inward while the two I, I', open into the compartment E', these form a communication with the outer air and the cylinder on each side of the diaphragm at one end, and with the interior of the cylinder and the forge at the other end.

The valves should fit closely, and be hung so as to open and close readily and harmoniously, and the trunnions sustaining the cylinder should be properly secured and well packed, so that the air can not escape at their joints, and this comprises the entire apparatus, with the exception of the water, that is poured into the cylinder through an orifice $b$, which is afterwards closed tightly. From this description it will be understood that by rocking the cylinder A, to and fro, the water, which about half fills the cylinder, will flow back and forth from one side of the diaphragm, J, to the other, and while it is forcing the air out from one valve opening, it will be drawing air in on the opposite side of the partition through the valve opening in the other end of the cylinder, for instance, by referring to Fig. 2, of the drawings, suppose the handle shown projecting from the cylinder be depressed, the water in the cylinder will instantly rush under the diaphragm J, and fill the apartment G', at the same time drawing air into the apartment G, it had just left, and forcing the air, contained in the apartment it enters, out through the valve I', opening outward, through the tubes C, C', and to the fire. Now by again raising the handle the water will rush back and force the air out from the other side, G, of the diaphragm, and at the same time fill the other, G', with air. In this way and by a rapid vibratory movement of the cylinder A, a continuous and steady blast of air may be obtained by an apparatus exceedingly simple in its construction and arrangement.

Having thus described my invention, what I claim as new and desire to secure by Letters Patent, is—

The arrangement, in cylinder A, of partitions F, F', with their valves H, H', and I, I', and central partition J, when the same are combined, and a blast of air is obtained substantially in the manner, and for the purposes described.

WM. THOMSON.

Witnesses:
JOHNSON BROWN,
J. Q. A. HOUSTON.